United States Patent
Hochuli et al.

(10) Patent No.: US 6,585,573 B2
(45) Date of Patent: Jul. 1, 2003

(54) DEVICE FOR THE TAILSTOCK END CENTERING AND CLAMPING OF A WORKPIECE WITH A CIRCULAR-CYLINDRICAL END

(75) Inventors: Peter Hochuli, Volketswil (CH); Giorgio Scacchi, Hinwil (CH)

(73) Assignee: Reishauer AG, Wallisellen (CH)

( * ) Notice: Subject to any disclaimer, the term of this patent is extended or adjusted under 35 U.S.C. 154(b) by 51 days.

(21) Appl. No.: 09/933,812

(22) Filed: Aug. 22, 2001

(65) Prior Publication Data

US 2002/0025768 A1 Feb. 28, 2002

(30) Foreign Application Priority Data

Aug. 22, 2000 (DE) .......................... 100 40 952

(51) Int. Cl.⁷ ................................. B24B 5/00
(52) U.S. Cl. ................ 451/243; 451/397; 279/133
(58) Field of Search ................. 451/243, 397, 451/398, 399, 400, 401, 242; 279/51, 133; 82/150

(56) References Cited

U.S. PATENT DOCUMENTS 3,410,031 A  * 11/1968 Soong ........................ 451/390
3,427,761 A    2/1969 Kulson
4,809,465 A  *  3/1989 Mushardt et al. ............ 451/342
5,746,436 A  *  5/1998 Kulan et al. ................ 279/4.04

FOREIGN PATENT DOCUMENTS

DE   38 22 565    12/1988
DE   38 19 407    11/1990

* cited by examiner

*Primary Examiner*—Dung Van Nguyen
(74) *Attorney, Agent, or Firm*—Browdy and Neimark, P.L.L.C.

(57) ABSTRACT

The device according to the invention for the tailstock end centering and clamping of a rotational workpiece with a circular-cylindrical end comprises a housing with a shank for accommodation in a tailstock barrel, and a chucking pot with a collet located in the housing for rotation about the axis of rotation of the workpiece. In accordance with the invention the collet is closable by way of the axial advancing action of the tailstock, and the axial tailstock thrust effecting the closing and clamping of the collet is transmitted to the workpiece in such manner that it is applied to the center of the workpiece, and the latter is displaceable into the center without friction generating radial sliding of the collet.

9 Claims, 3 Drawing Sheets ized set-up of the
DEVICE FOR THE TAILSTOCK END CENTERING AND CLAMPING OF A WORKPIECE WITH A CIRCULAR-CYLINDRICAL END The invention concerns the tailstock end chucking of a shaft shaped workpiece on a gear grinding machine. On account of the high accuracy that must be attained in grinding the precut and hardened gear teeth, the ends of the shafts of the gears to be ground are usually provided with centre bores which define the axis of rotation of the workpiece, and serve the accurate centralizing set-up of the workpiece. The centring via live or dead tailstock centre in the barrel or on the tailstock slide, which is pressed into the centre bore of the workpiece under a preset axial thrust, governs the radial position of the tailstock end workpiece shaft, and is of sufficient rigidity to absorb the radial machining forces when grinding the gear teeth. By way of the central application of the axial tailstock force, all bending forces on the shaft shaped workpiece and the ensuing elastic deformation of the workpiece are avoided. With this kind of work set-up, a reliable clamping and centring of the workpiece with optimum running concentricity is achieved.

In practice, however, cases can also occur in which, for example, for the sake of a less expensive manufacturing process, or on account of the pre-machining of the workpiece by centreless grinding, the centre bores at the shaft ends of the workpiece are dispensed with, and the workpiece must be centred by means of the cylindrically ground tailstock and headstock ends of the workpiece shaft. A feasible solution to this task is, for examples a centrally clamping, rotating collet on the tailstock barrel, which is actuated electromechanically, hydraulically or pneumatically after the axial advance of the tailstock to the clamping position. This solution certainly assures an exact centring of the tailstock end of the workpiece shaft, but it has the disadvantage that for the closing of the collet at the tailstock end, in addition to the axial advance of the tailstock, a power operated clamping mechanism with energy supply to a rotating component must be provided, which raises costs and reduces the reliability, occupies space in the working area of the machine, and increases the risk of soiling of the working area due to the precipitation of grinding swarf and grinding wheel dust.

The object of the present invention is to introduce a tailstock end work fixture for shafts without centre bore, using a collet of high centring accuracy, with which these disadvantages are avoided. The task is fulfilled by way of the features in accordance with the claims.

Figure 1:
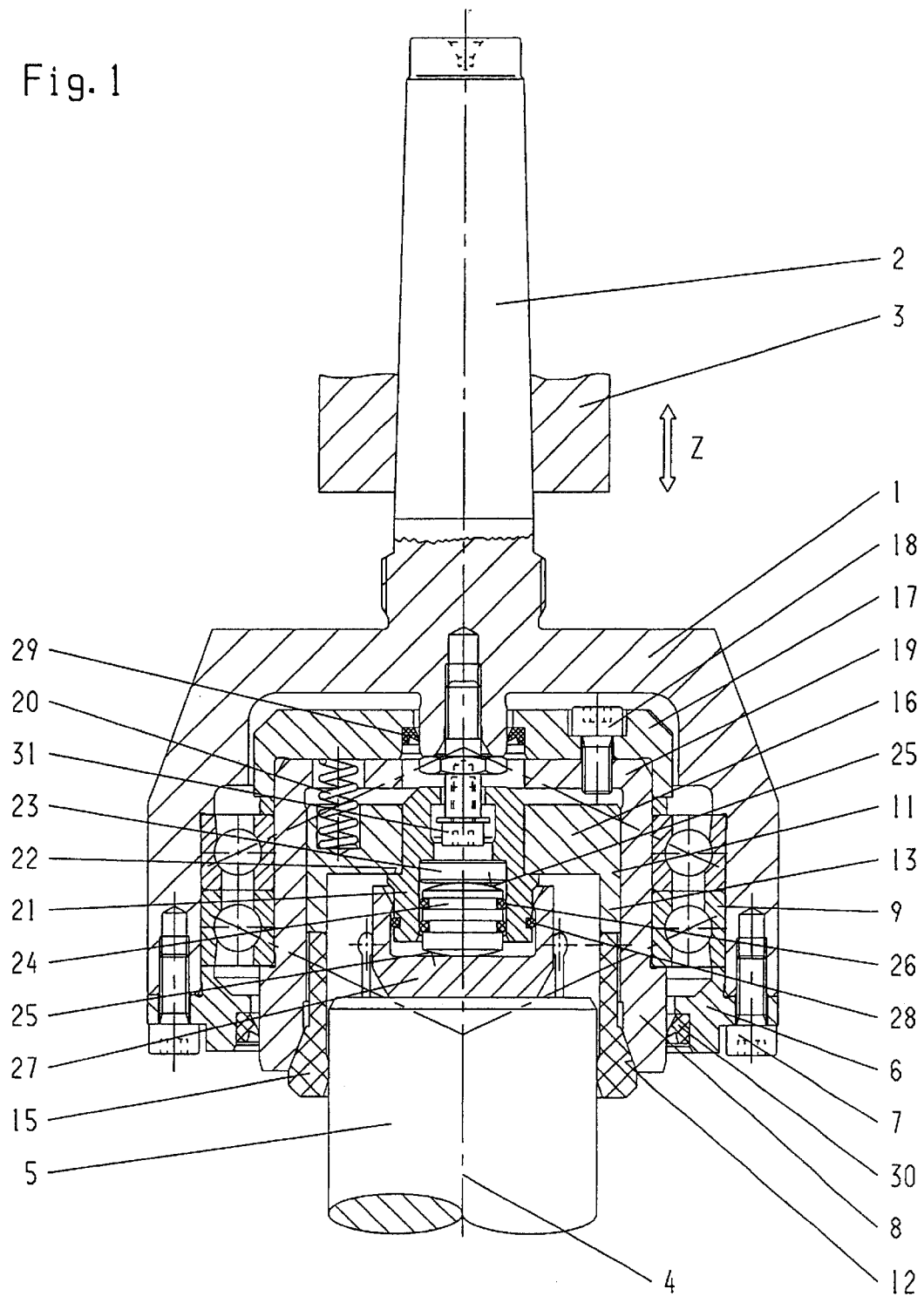
Figure 2:
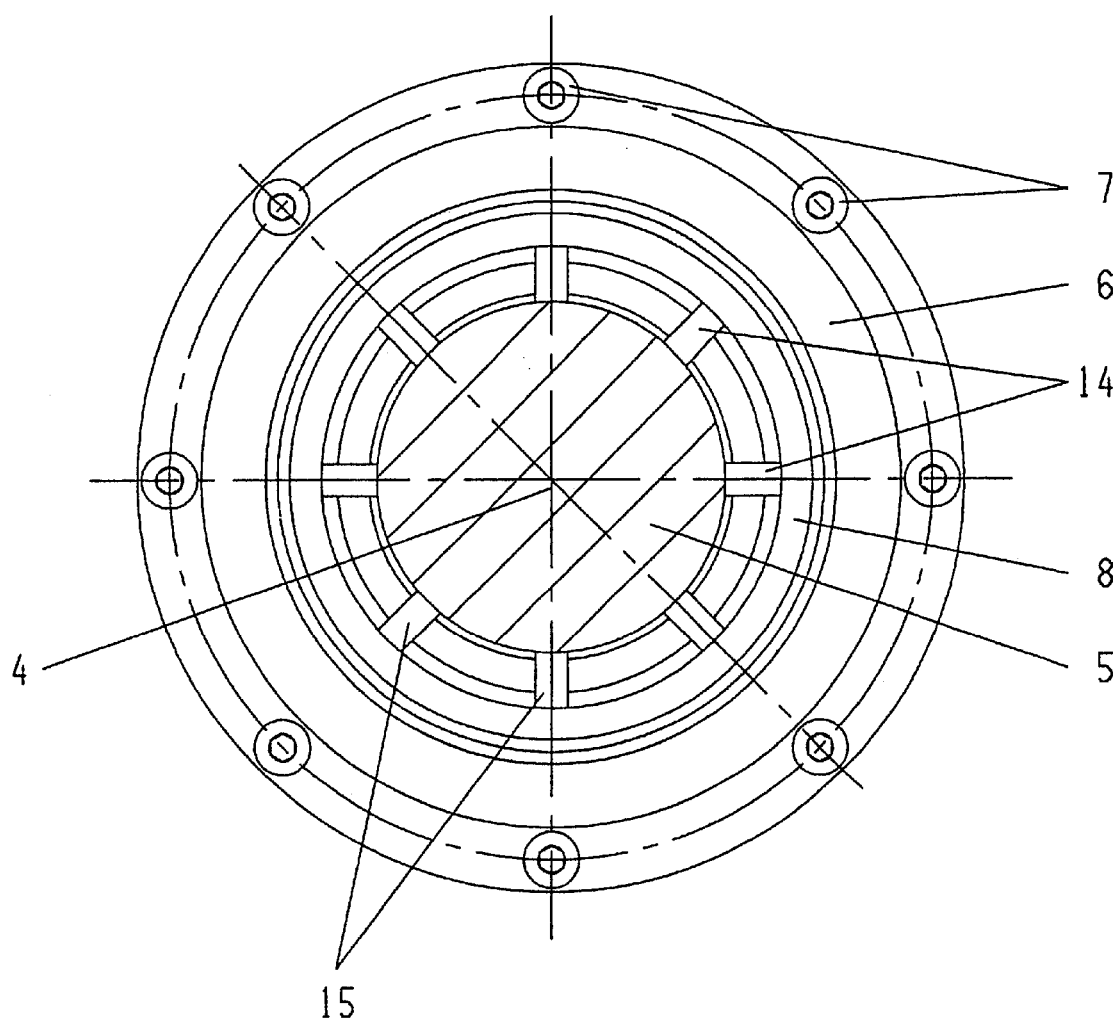
Figure 3:
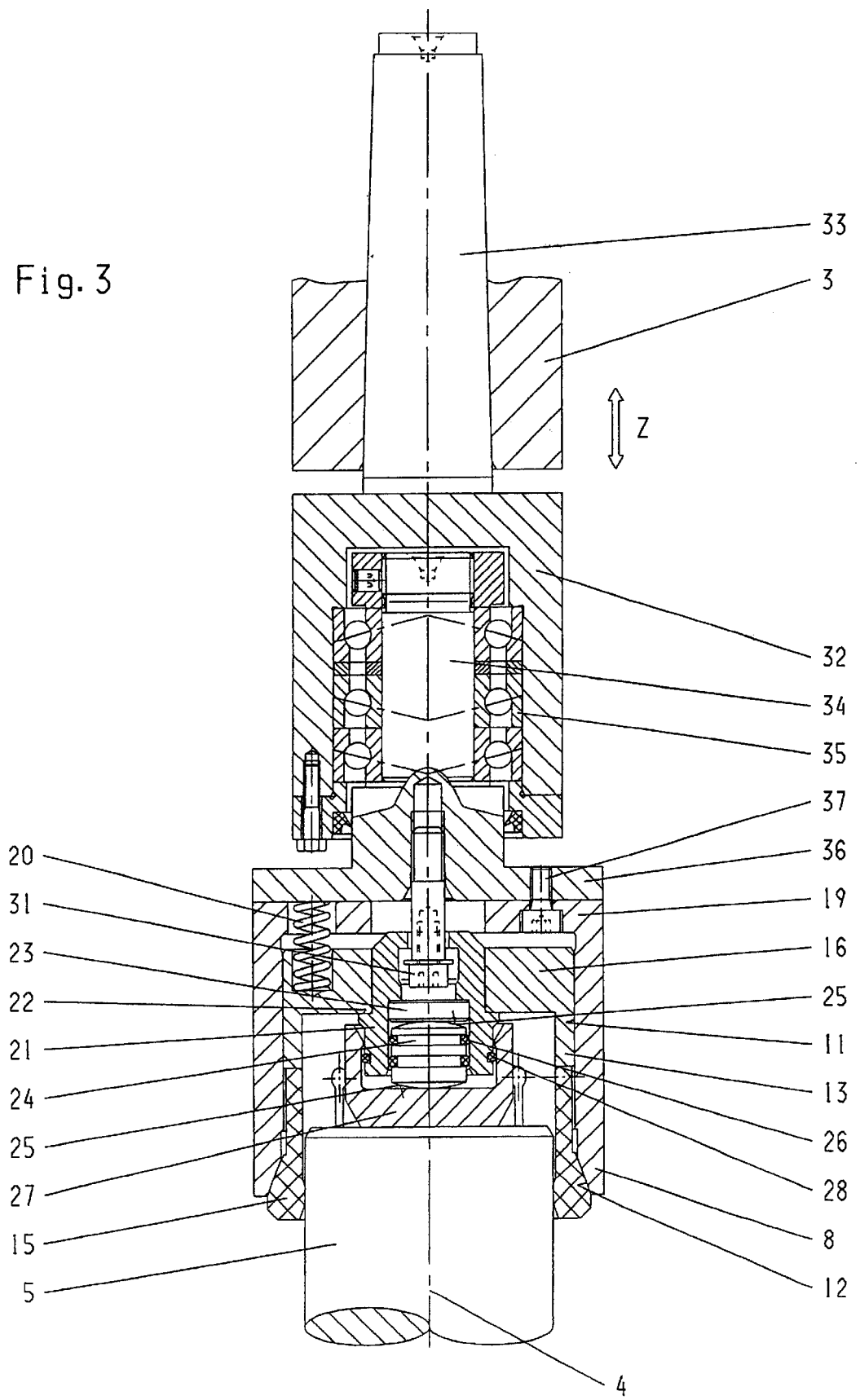

In the following the invention is described via the example of a tailstock end fixture for a gear shaft with concentrically ground cylindrical seating without centre bore at the shaft end in a gear grinding machine, referring to the detailed drawings. These depict:

FIG. 1 The axial section through the invented device, with the workpiece shaft end clamped, FIG. 2 A view of the device from the workpiece side in the direction of the axis of rotation of the workpiece, and FIG. 3 A constructional variant of FIG. 1.

The bell-shaped housing 1 of the work fixture according to the invention is connected rigidly via its concentric taper shank 2 to the machine tailstock barrel 3—which is displaceable by power parallel to the axis in the Z-direction—and is centred relative to the axis of rotation 4 of the workpiece 5. Located in a double row, pre-tensioned angular contact bearing 9 for rotation inside the housing 1, which is closed by the cover flange 6 and bolts 7, is the chucking pot 8. The cylindrical bore 11 and the female taper 12 at the open end of the chucking pot 8 serve to accommodate the axially multi-slotted collet 13, the slots 14 being filled with oil resistant elastic material 15 to prevent the penetration of grinding swarf and grinding wheel dust into the inside of the chucking pot.

Between the collet base 16 and the cover 17, which is rigidly attached to the base 19 of the chucking pot 8 with the bolts 18, there are 4 compression springs 20 arranged parallel to and concentric about the axis of rotation 4, which release the collet 13 prior to the removal of the workpiece.

In a central longitudinal bore in the collet base 16 is a sleeve 21, the outer shoulder 22 of which rests against the collet base 16. Between the round, hardened and ground thrust plate 23 and the end face of the workpiece 5 are the hardened cylindrical thrust stud 24 with domed end faces 25 and elastic rings 26 in grooves on the circumference for elastic support on the inner wall of sleeve 21, and—bearing against the contact surface of the thrust stud 24—the hardened and ground thrust cap 27, which is held and centred via an elastic ring 28 by the sleeve 21.

Shaft seals 29, 30 protect the inside of the work fixture against the penetration of swarf and grinding wheel dust. The collet 13 is prevented from falling out by the bolt 31.

To centre and clamp the workpiece 5, the open collet is pushed over the shaft end of the workpiece 5 by displacing the barrel 3 in the Z-direction. As soon as the end face of the workpiece and the thrust cap 27 make contact, the closing action of the collet begins by the axial displacement of the chucking pot a relative to the collet 13, which bears against the end face of the workpiece 5 via the thrust cap 27, the thrust stud 24, the thrust plate 23 and the outer shoulder 22 of the sleeve 21. In the process the shaft end of the workpiece is firstly centred by the collet 13, then clamped radially until the tailstock axial thrust has reached the desired preset value. The resistance to the radial displacement of the workpiece occurring during centring is extremely slight, because thanks to the radial elastic support of both the thrust cap 27 and the thrust stud 24 on and in the sleeve 21 respectively, the thrust cap 27 bearing against the workpiece end can be shifted without effort, and with it the point of contact of the thrust stud 24 on the inner face of the thrust cap 27. The domed end faces 25 of the thrust stud 24 thereby perform a rolling action on the thrust plate 23 and the inner face of the thrust cap 27, 50 that any frictional sliding of components involved in the force flow path is avoided.

FIG. 3 shows a variant of the work fixture according to the invention, which is put into use when the grinding point on the workpiece lies close to the tailstock end chucking point, and the outer diameter of the work fixture must be smaller than in FIG. 1 in order to avoid collision with the grinding tool. The reduction in the outer diameter of the work fixture is achieved in that the bearing support for the chucking pot 8 is arranged axially displaced between the barrel 3 and the chucking pot 8. The bearing housing 32 is connected rigidly to the barrel 3 by its concentric tapered shank 33. In the inside of the bearing housing 32 is the bearing stud 34, located in a three-row pre-tensioned angular contact bearing 35 for rotation about the axis of rotation 4.

The bearing stud 34 and chucking pot 8 are connected rigidly together by way of flange 36 and bolts 37.

Decisive prerequisites for the high precision workpiece centring and workpiece clamping demanded here are the avoidance of radial forces during the centring action and eccentric axial forces exerted on the workpiece, which might deform the latter. These prerequisites are complied with according to the invention by the nature of the force transmission from the tailstock to the workpiece without sliding between the contacting component parts, and by the design of the components involved in the force flow path, by which the radial forces on the workpiece 5 and the eccentricity of the point of application of the axial tailstock force on the workpiece are kept so low that the most stringent of demands on the accuracy of the work fixture can be fulfilled, even in the event of substantial axial run-out of the end face of the workpiece 5.

What is claimed is:

1. Device for a tailstock end centering and clamping of a rotational workpiece with a circular-cylindrical end, comprising a housing with a shank for accommodation in a tailstock barrel and a chuckling pot with a collet located in bearings in said housing for rotation about an axis of rotation of said workpiece, wherein said collet is closable by axially advancing said tailstock barrel, and wherein an axial tailstock force effecting the closing and clamping of said collet is transmitted to said workpiece in such manner that it is applied to a centre of said workpiece, and said workpiece is displaceable into a centre of the tailstock by said collet without radial sliding generating frictional forces.

2. Device according to claim 1, wherein an axial advancing thrust of said barrel is transmitted from a thrust plate via a body domed at both ends to a thrust cap bearing against an end face of said workpiece, in which in a load relieved state said body and said thrust cap are held centred by elastic rings.

3. Device according to claim 2, wherein surfaces of said thrust plate, of said body and of said thrust cap which make mutual rolling contact are hardened and ground.

4. Device according to claim 2, wherein said body is a cylindrical stud domed at both ends.

5. Device according to claim 4, wherein said stud is centred in a cylindrical bore of a sleeve by two axially spaced elastic first rings, and wherein said thrust cap is centred on an outer periphery of said sleeve by at least one second elastic ring.

6. Device according to claim 4, wherein end faces of said stud are domed with a radius of curvature equal to at least half the length of said stud.

7. Device according to claim 1, wherein an inner space of said housing is protected against soiling via elastic material in slots of said collet and via seals.

8. Device according to claim 1, wherein said collet is pre-tensioned relative to said housing in a direction of opening by at least one axially acting spring.

9. Device according to claim 1, wherein said chucking pot and its bearing are arranged axially one behind the other in a bearing housing.

* * * * *